United States Patent Office 3,332,900
Patented July 25, 1967

3,332,900
PROCESSING AIDS
Artur Reischl, Leverkusen, Wilhelm Göbel, Cologne-Flittard, Harry Röhr, Cologne, and Walter Simmler, Cologne-Mulheim, Germany, assignors to Farbenfabriken Bayer Aktiengesellschaft, Leverkusen, Germany, a German corporation
No Drawing. Filed July 6, 1964, Ser. No. 380,673
Claims priority, application Germany, July 11, 1963, F 40,210
7 Claims. (Cl. 260—29.1)

This invention relates to polyvinyl plastic compositions, and more particularly, to a unique processing aid therefor.

In the preparation of polyvinyl chloride, polyvinylidene chloride, polyvinyl acetate and copolymers of the corresponding monomers, as well as ethylene-vinyl acetate copolymers, organic and/or inorganic compounds are added to facilitate the formation of plastic mixtures. Some compounds such as, for example, fatty acid amides or esters are frequently employed in quantities of from about 0.5 to 3% by weight in order to supply a lubricant for these plastic systems. Although such lubricants certainly facilitate the thermoplastic processing operation, in some cases such as, for example, when ethylene-vinyl acetate copolymers are used, it has been found that such lubricants are highly incompatible with the polymers, even in small quantities and make the polymers to which they are added cloudy or hazy. In addition, there is a tendency for the incompatible additive to migrate out of the polyvinyl plastic and appear as a film or skin on the surface. The process is known as blushing or blooming and is highly undesirable since it adversely affects both the physical and mechanical properties of the polymer.

It is, therefore, an object of this invention to provide an aid for the processing of a polyvinyl plastic which is devoid of the foregoing disadvantages.

It is a further object of this invention to provide a lubricant for polyvinyl compositions which is highly compatible with the polyvinyl plastic system and which acts as plasticizer as well as an agent to facilitate blending.

It is a further object of this invention to provide a vinyl polymer possessing excellent surface gloss and mechanical properties unimpaired by any blushing or blooming of the constituent added to improve the processing of the polymer.

These and other objects are accomplished in accordance with this invention, generally speaking, by providing an organosiloxane polyisocyanate addition product as a lubricant in polyvinyl plastics or mixtures thereof. The siloxane-modified polyisocyanate is generally added to the synthetic plastic in a lubricating amount, and generally, a quantity of the organosiloxane polyisocyanate adduct is used such that from about 0.01% to about 30% by weight and higher of the organosiloxane segment of the lubricant is present based on the weight of the polyvinyl plastic. In the preferred embodiment of this invention, it has been found that for the very best results it is advisable to use enough of the organosiloxane-polyisocyanate adduct such that from about 0.1% to about 5% by weight of the organosiloxane segment of the lubricant is present based on the weight of the polyvinyl plastic to which it is added.

Such compounds when used as lubricants in synthetic plastic systems comprised of polyvinyl chloride, polyvinylidene chloride, polyvinyl acetate, polyvinyl alcohol or copolymers of the basic monomers thereof, as well as ethylene-vinyl-(alcohol) acetate copolymers or graft polymers produced with vinyl chloride, effect great improvements in the processing of such plastics. For example, such processing operations as rolling, extrusion, calendering and injection molding are greatly facilitated due to the superior ease of handling of the polymers thus lubricated. Further, the vinyl polymer mixtures produced with the processing aid of this invention generally have an excellent surface gloss and a greatly reduced inherent tackiness. In most cases, the inherent tackiness of the polyvinyl polymeric composition is even completely eliminated. Moreover, due to the high degree of compatibility of the lubricant of this invention with the polyvinyl polymers, there is no clouding effect in the polymer and a completely haze-free product may be fabricated. As a further consequence, in the improved polymer obtained due to the compatibility of the lubricant therewith, there is no tendency on the part of the lubricant to migrate out of the polymer and a polyvinyl composition having high surface gloss, pleasing hand, and excellent transparency may be obtained.

In addition, in the preparation of polyurethane modified polyvinyl compositions, wherein the polyurethane is included as a plasticizer, or where cross-linked polyurethanes are prepared with vinyl polymers the organosilicon polyisocyanate adduct may be used both as a lubricant and as the plasticizer in addition to being used as the constituent which forms a cross-linked polyurethane with the vinyl polymers to be lubricated depending on the reaction conditions and the end product desired. Further, the polyisocyanate modified organosiloxane also functions as a blending agent.

Any suitable organosilicon compound containing at least one group having hydrogen atoms reactive with a —NCO group and determinable by the Zerewitinoff method may be used to prepare the organosiloxane-polyisocyanate addition product. However, organo-functional silicon compounds which carry the organo function through a carbon bridge on the silicon atom are preferred to those compounds which have the organo function attached directly to the silicon atom because of their improved resistance to hydrolysis. Typical compounds suitable for the purposes of this invention include:

$$\text{HOH}_2\text{C}-\underset{\underset{\text{CH}_3}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}-\text{CH}_2\text{OH}$$

$$\text{NOH}_2\text{C}-\underset{\underset{\text{C}_2\text{H}_5}{|}}{\overset{\overset{\text{C}_2\text{H}_5}{|}}{\text{Si}}}-\text{O}-\underset{\underset{\text{C}_2\text{H}_5}{|}}{\overset{\overset{\text{C}_2\text{H}_5}{|}}{\text{Si}}}-\text{O}-\underset{\underset{\text{C}_2\text{H}_5}{|}}{\overset{\overset{\text{C}_2\text{H}_5}{|}}{\text{Si}}}-\text{CH}_2\text{OH}$$

$$\text{HOH}_2\text{C}-\underset{\underset{\text{CH}_3}{|}}{\overset{\overset{\text{CH}_3}{|}}{\text{Si}}}-\left[-\text{O}-\underset{\underset{\text{CH}_3}{|}}{\overset{\overset{\text{CH}_3}{|}}{\text{Si}}}-\right]_n\text{O}-\underset{\underset{\text{CH}_3}{|}}{\overset{\overset{\text{CH}_3}{|}}{\text{Si}}}-\text{CH}_2\text{OH}$$

wherein $n=0$ to 100 or more.

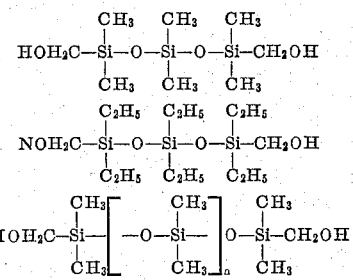

$$\text{NH}_2-\text{CH}_2-\underset{\underset{\text{CH}_3}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}-\text{CH}_2-\text{NH}_2$$

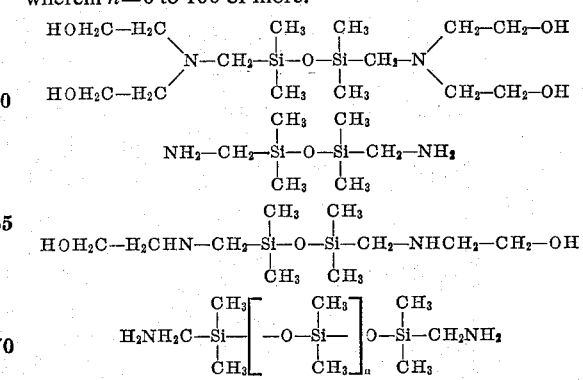

wherein $n=0$ to 100 or more.

$$HOOC-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n-O-\underset{\underset{CH_3}{|}}{\overset{\overset{CH_3}{|}}{Si}}-COOH$$

wherein $n=0$ to 100 or more.

$$HO-CH-CH_2-CH-O-CH_2-\underset{\underset{CH_3}{|}}{\overset{\overset{CH_3}{|}}{Si}}-O-[-\underset{\underset{CH_3}{|}}{\overset{\overset{CH_3}{|}}{Si}}-O-]_n-\underset{\underset{CH_3}{|}}{\overset{\overset{CH_3}{|}}{Si}}-CH_2-O-CH-CH_2-CH-OH$$
$$\phantom{HO-CH}R\phantom{-CH_2-}R\phantom{-CH-O-CH_2-Si-O-[-Si-O-]_n-Si-CH_2-O-CH-CH_2-}R\phantom{-CH_2-CH-}R$$

wherein $n=0$ to 100 or more and R=hydrogen and methyl (1:1);

$$HO-(CH_2)_3-O-(CH_2)_3-O-CH_2-\underset{\underset{CH_3}{|}}{\overset{\overset{CH_3}{|}}{Si}}-O-[-\underset{\underset{CH_3}{|}}{\overset{\overset{CH_3}{|}}{Si}}-O-]_n-\underset{\underset{CH_3}{|}}{\overset{\overset{CH_3}{|}}{Si}}-CH_2-O-(CH_2)_3-O-(CH_2)_3-OH$$

wherein $n=0$ to 100 or more;

$$CH_3-CH_2-\underset{\underset{CH_2-OH}{|}}{\overset{\overset{CH_2-OH}{|}}{C}}-O-CH_2-\underset{\underset{CH_3}{|}}{\overset{\overset{CH_3}{|}}{Si}}-O-[-\underset{\underset{CH_3}{|}}{\overset{\overset{CH_3}{|}}{Si}}-O-]_n-\underset{\underset{CH_3}{|}}{\overset{\overset{CH_3}{|}}{Si}}-CH_2-O-CH_2-\underset{\underset{CH_2-OH}{|}}{\overset{\overset{CH_2-OH}{|}}{C}}-CH_2-CH_3$$

wherein $n=0$ to 100 or more;

$$H[-O-CH_2-\underset{\underset{CH_2-OH}{|}}{\overset{\overset{\overset{\overset{CH_3}{|}}{CH_2}}{|}}{C}}-CH_2-O-CH_2-\underset{\underset{CH_3}{|}}{\overset{\overset{CH_3}{|}}{Si}}-O-\left(-\underset{\underset{CH_3}{|}}{\overset{\overset{CH_3}{|}}{Si}}-O-\right)_n\underset{\underset{CH_3}{|}}{\overset{\overset{CH_3}{|}}{Si}}-CH_2-]_x-OH \quad (Br)$$

wherein $n=0$ to 100 or more and $x=1$ to 100 or more;

$$HOCH_2-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n-O-\underset{\underset{CH_3}{|}}{\overset{\overset{CH_3}{|}}{Si}}-CH_3$$

wherein $n=0$ to 100 or more.

$$H_2NCH_2-\underset{\underset{CH_3}{|}}{\overset{\overset{CH_3}{|}}{Si}}-\left[-O-\underset{\underset{CH_3}{|}}{\overset{\overset{CH_3}{|}}{Si}}-\right]_n-O-\underset{\underset{CH_3}{|}}{\overset{\overset{CH_3}{|}}{Si}}-CH_3$$

wherein $n=0$ to 100 or more.

$$H_2N\underset{\underset{H}{|}}{\overset{\overset{H}{|}}{C}}-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-CH_3$$

$$\underset{HO(CH_2)_4}{\overset{HO(CH_2)_4}{}}N-CH_2-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-N\underset{(CH_2)_4OH}{\overset{(CH_2)_4OH}{}}$$

Examples of compounds suitable for this invention and having an alkylene radical bonded to a silicon atom which forms a grouping containing reactive hydrogen upon the splitting of an Si—X—O bridge include all compounds containing the following grouping:

$$\left[-\underset{\underset{CH_3}{|}}{\overset{\overset{CH_3}{|}}{Si}}-X-O-\right]_r\left[-\underset{\underset{CH_3}{|}}{\overset{\overset{CH_3}{|}}{Si}}-O-\right]_s$$

wherein the ratio of $r$ to $s$ is 2 to 10.

Specific compounds of this type include:

$$CH_3-\left[-\underset{\underset{CH_3}{|}}{\overset{\overset{CH_3}{|}}{Si}}-CH_2-O-\right]_2\left[-\underset{\underset{CH_3}{|}}{\overset{\overset{CH_3}{|}}{Si}}-O-\right]_{10}-Si(CH_3)_3$$

$$CH_3-\left[-\underset{\underset{CH_3}{|}}{\overset{\overset{CH_3}{|}}{Si}}-CH_2-CH_2-O-\right]_4\left[-\underset{\underset{CH_3}{|}}{\overset{\overset{CH_3}{|}}{Si}}-O-\right]_{20}-Si(CH_3)_3$$

Further, any suitable organic polyisocyanate may be used in the preparation of the organosiloxane polyisocyanate adducts. The following are specific examples of such suitable organic isocyanates and although only the isocyanates are listed, it is to be understood that the corresponding isothiocyanates are meant to be included and are within the contemplated scope of this invention.

Examples of suitable organic diisocyanates which may be used either alone or in admixture are aliphatic, aromatic, or heterocyclic diisocyanates such as tetramethylene diisocyanate, hexamethylene diisocyanate, decamethylene diisocyanate, cyclohexane-1,4-diisocyanate, dicyclohexylmethane-4,4'-diisocyanate, meta-xylylene diisocyanate, naphthalene-1,5-diisocyanate, para-xylylene diisocyanate, meta-phenylene diisocyanate, para-phenylene diisocyanate, diphenyl dimethyl methane-4,4'-diisocyanate, 3,3'-dimethoxy diphenylmethane-4,4'-diisocyanate, 1,3-diisocyanato cyclobutane and the like. The following are examples of polyisocyanates whose —NCO groups differ in their reactivity: toluylene-2,4-diisocyanate, toluylene-2,6 - diisocyanate, 1 - chlorobenzene-2,4-diisocyanate, 3-methyl diphenyl methane-4,4'-diisocyanate, 1-methyl cyclohexane-2,4-diisocyanate, 1-methyl cyclohexane-2,6-diisocyanate and the like. Any suitable uretdione such as 1,3-bis-[4'-methyl-3'-isocyanatophenyl]-uretdione may be used.

It is also possible to use in addition to the organic diisocyanates, organic monoisocyanates such as phenyl isocyanate, methyl isocyanate, benzyl isocyanate, butyl isocyanate, hexyl isocyanate and the like or polyisocyanates which have more than two —NCO groups per molecule such as, for example, p,p',p''-triphenylmethane triisocyanate or the like. Trifunctional isocyanates, such as the reaction products of trihydric alcohols and diisocyanates, or triisocyanates containing biuret groups can also be used. The isocyanates and their corresponding isothiocyanates may also contain ether, ester or carbodiimide groups.

The organosiloxane addition products may be prepared from the above constituents simply by stirring an isocyanate and an organosiloxane having reactive hydrogen atoms capable of reacting with a —NCO group together for 1 to 2 hours at a temperature of about 80° to 150° C.

The ratio of organosiloxane and isocyanate is not critical. It is possible to produce and use materials with free NCO groups as well as those without free NCO groups. It is only necessary to choose the reactants in such a way that a molecular weight of at least 3000 and preferably of at least 8000 results. There is no maximum molecular weights to be observed. Any molecular weight above 3000 which is producible with these reactants is useful for lubricating purposes.

One may also prepare adducts in which are included other compounds capable of reacting with —NCO groups such as monohydric and polyhydric alcohols, amines, amino alcohols or polyesters, polyethers, polythioethers, polyester amides, or polyacetals which contain hydroxyl groups and also water. The concurrent use of the latter with the isocyanate and the reactive hydrogen-containing organosiloxane in preparing the lubricant increases the compatibility of the organosiloxanes, especially those which have a significantly long-chained molecular structure.

Such suitable active hydrogen containing compounds are those which have a molecular weight of at least about 200 and preferably between about 500 and about 5000 with an hydroxyl number within the range of from about 25 to about 800 and acid number, where applicable, below about 5. A satisfactory upper limit for the molecular weight of the organic compound containing at least two active hydrogen containing groups is about 10,000.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexane triol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having relatively high molecular weight including other active hydrogen containing compounds as disclosed herein. It is preferred that the initiator have from 2 to 8 active sites to which the alkylene oxides may add, including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required as more particularly set forth below. The resulting polyhydric polyalkylene ethers with the various bases of nitrogen, phosphorous and the like may have either primary or secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p"-triphenylmethane triamine, ethylene diamine, propylene diamine, propylene triamine, N,N,N',N'-tetrakis-(2-hydroxpropyl)-ethylene diamine, diethylene triamine. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable monohydric alcohol may be used, such as methanol, ethanol, propanol, butanol, pentanol, hexanol, heptanol, octanol, nonanol, decanol, and so on.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrols and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diaminotoluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-aminomethyl pyrimidine, 2,5-diamino-1,3,4-thiadiazol and the like.

The organosiloxane-polyisocyanate addition products thus prepared may therefore be of high or low molecular weight, and linear, branched or cross-linked in structure. The products, depending on their structure may be highly viscous oils, solid to waxy compositions or elastomeric adducts. It is preferable to use the cross-linked and/or branched organosiloxane-isocyanate adducts of higher molecular weight since these compounds are outstanding lubricants due to their resistance to migration and their elasticizing action.

The organosiloxane-polyisocyanate addition products may be incorporated into the vinyl polymers by any suitable method well known in the processing of such vinyl polymers. For example, the powder forms of the vinyl polymer and the organosiloxane-polyisocyanate adduct may be blended together or the polyvinyl plastic may be calendered, extruded or banburied together with the organosiloxane-polyisocyanate adduct.

Three preferred methods for the preparation of the organosiloxane-isocyanate addition products are outlined in the following examples which have reference to the table below in order to illustrate more completely the most convenient modes of preparing the lubricant of this invention.

*Method 1*

A mixture of the components of any one of the formulations numbered I to VIII is gradually heated to about 130° C. and left to cool after heating for one to two hours.

*Method 2*

The organic silicon compound is initially supplied and reacted at about 80 to 120° C. with a diisocyanate. The sequence can also be reversed. Another compound containing hydroxyl groups can thereafter be reacted with the adduct at the same temperature until the reaction is complete, if desired.

*Method 3*

A mixture of a polyester, an organosiloxane and a polyisocyanate is heated to about 50 to 100° C. while stirring and a glycol is added after about 5 to 20 minutes. It is also possible for all components to be simultaneously brought slowly to about 100° to 120° C. and, after the reaction has subsided, for the melt to be subsequently heated in casting molds for 3 to 8 hours at about 100° C.

The data in the following chart referred to in the footnote as being in parts by weight are the numbers just preceding the letters.

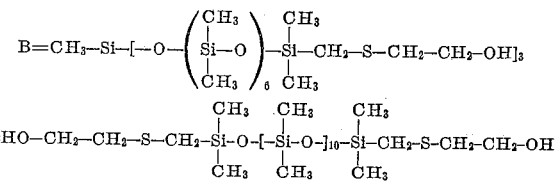

The following examples in which all parts and percentages are by weight unless otherwise specified further illustrate but are not intended to limit the invention.

EXAMPLE 1

About 60 parts of a polyvinyl chloride having a K-value of about 70 and produced by emulsion polymerization are processed with about 40 parts of a polyester plasticizer based on adipic acid/butane-1,3-diol and about 0.6 part of diphenyl thiourea as stabilizer, with addition of the products indicated in Table I, the processing being effected for about 6 to about 8 minutes on a mixing roll stand heated to about 160° C. to form rolled sheets and these are treated by pressing in about 5 minutes at about 160° C. to form compressed plates, from which the corresponding test elements are cut.

The samples containing organosiloxane polyisocyanate addition products show a more favorable behavior by comparison with a sample without additive on being processed on the roller. They can be more quickly homogenized and have less tendency to stick. The foils are characterized by a pleasing "handle" and a particular surface gloss and do not cake together. The mechanical properties of the finished products are not changed. The resistance to migration of the additives is better than that of the polymeric plasticizer which is used.

TABLE I

| Lubricant | Parts by Weight | DIN 53 504 Tensile Strength, kp./cm.² | Elongation at break, percent | DIN 53 405 [1] | |
|---|---|---|---|---|---|
| | | | | a | b |
| None | | 123 | 199 | −1.0 | +0.4 |
| I | 0.3 | 148 | 208 | −0.9 | +0.4 |
| I | 0.5 | 159 | 236 | −0.9 | +0.4 |
| I | 1.0 | 146 | 230 | −1.0 | +0.4 |
| II | 0.5 | 153 | 197 | −0.8 | +0.3 |
| III | 0.5 | 142 | 184 | −1.0 | +0.5 |
| IV | 0.5 | 154 | 205 | −0.9 | +0.4 |

[1] Plasticizer migration according to DIN 53 405.
a = Percent loss of weight of the foil giving off plasticizer.
b = Percent difference in weight of the foil taking up plasticizer (calculated on the initial weight of the foil giving off plasticizer).

|  | Silicon Compound | Diisocyanate | Polyester and Glycol | Method | Consistency |
|---|---|---|---|---|---|
| I | 583-A | 35 H | | 1 | Highly viscous liquid. |
| I | 1074-A | 210 D 15 | | 2 | Waxy. |
| II | 320-B | 30 H | | 1 | Viscous liquid. |
| V | 1000-A | 260 T 65 | 620 D 180 | 2 | Waxy. |
| V | 500-C | 130 T 65 | 130 D 180 | 1 | Do. |
| VI | 500-C | 126 H | 130 D 180 | 2 | Do. |
| VII | 30-A | 139 H | 925 D 56 plus 27 B | 3 | Elastomeric. |
| VIII | 23-A | Plus 30 TT 161 H | Plus 49 B 925 D 56 | 3 | Do. |

Data in parts by weight:
H—hexamethylene diisocyanate
D 15—naphthylene-1,5-diisocyanate
T 65—toluylene-2,4- and 2,6-diisocyanate (ratio 65:35)
TT—1,3-bis-[4′-methyl-3′-isocyanatophenyl]-uretdione
D 180—ethylene glycol-adipic acid polyester; OH number 180; acid number 1
D 56—hexanediol-neopentyl glycol-adipic acid polyester; OH number 65; acid number 1 (ratio 22:12:30)

$$A = HO-(RO)_2-CH_2-\underset{\underset{CH_3}{|}}{\overset{\overset{CH_3}{|}}{Si}}-O-[-\underset{\underset{CH_3}{|}}{\overset{\overset{CH_3}{|}}{Si}}-O-]_{10}-CH_2-(OR)_2-OH$$

$$R = -CH-CH_2- \text{ or } -CH_2-CH$$
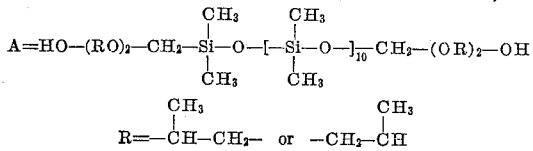

$$B = CH_3-Si-[-O-\left(\underset{\underset{CH_3}{|}}{\overset{\overset{CH_3}{|}}{Si}}-O\right)_6-\underset{\underset{CH_3}{|}}{\overset{\overset{CH_3}{|}}{Si}}-CH_2-S-CH_2-CH_2-OH]_3$$

$$C = HO-CH_2-CH_2-S-CH_2-\underset{\underset{CH_3}{|}}{\overset{\overset{CH_3}{|}}{Si}}-O-[-\underset{\underset{CH_3}{|}}{\overset{\overset{CH_3}{|}}{Si}}-O-]_{10}-\underset{\underset{CH_3}{|}}{\overset{\overset{CH_3}{|}}{Si}}-CH_2-S-CH_2-CH_2-OH$$

EXAMPLE 2

(a) About 60 parts of a polyvinyl chloride having the K-value about 70 and produced by emulsion polymerization are in each case processed with about 40 parts of one of the lubricants indicated in Table II and with addition of about 0.6 part of diphenyl thiourea as stabilizer, as described in Example 1, and then tested.

(b) The procedure is according to (a), but using about 50 parts of polyvinyl chloride, about 50 parts of lubricant and about 0.5 parts of stabilizer.

(c) Corresponding to (a), but using about 40 parts of polyvinyl chloride, about 60 parts of lubricant and about 0.4 part by weight of stabilizer.

TABLE II

| Lubricant | Example | | | | | |
|---|---|---|---|---|---|---|
| | a VII | a VIII | b VII | b VIII | c VII | c VIII |
| Tensile strength (kp./cm.²) Standard bar I (DIN 53 504) | 159 | 195 | 111 | 144 | 90 | 124 |
| Elongation at break (percent) | 490 | 236 | 478 | 223 | 614 | 375 |
| Tensile strength (kp./cm.²) ring (DIN 53 504) | 151 | 183 | 111 | 143 | 89 | 128 |
| Elongation at break (percent) | 360 | 185 | 422 | 161 | 512 | 328 |
| Permanent elongation (percent) | 21 | 29 | 34 | 24 | 45 | 36 |
| Modulus (kp./cm.²) at 20 and 300° | 47/149 | 107/– | 20/104 | 69/– | 15/76 | 33/127 |
| Shore hardness A/D (DIN 53 505) | 94/46 | 96/51 | 84/– | 93/42 | 80/– | 86/– |

EXAMPLE 3

About 25 grams (corresponding to 0.35% by weight based on the organosiloxane segment) of the organosiloxane polyisocyanate adduct V and VI, respectively, are uniformly incorporated by mixing for about 10 minutes into about 5000 g. of ethylene-vinyl acetate copolymer with a content of about 29.6% of vinyl acetate and a melt index of about 9.2 (g./10 min.), the mixing taking place on a mixing roll stand heated to about 80°. After cooling, the material is granulated and processed by means of an extruder into a hose (tube) with an internal diameter of about 9 mm. and a wall thickness of about 1.5 mm. (worm speed 30 r.p.m., tool temperature about 95 to 100° C.).

The hose or tube which is formed is characterized by a particularly smooth and lustrous surface and reduced natural tackiness by comparison with a tube consisting of material without additive. The delivery capacity of the extruder is improved by the lubricant added according to the invention. In order to produce the same delivery as in the above example, a worm speed of 50 r.p.m. is necessary when using the material without additive. The effect of the lubricants V and VI is practically the same. Formerly, N,N′-ethylene-bis-stearine amide was used in quantities of about 1 to 2% as lubricant in ethylene-vinyl acetate copolymers, but this addition produced a strong clouding effect in the copolymers. On the contrary, the lubricants V and VI have practically no deleterious effect on the transparency.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A synthetic resin composition comprising a vinyl polymer selected from the group consisting of polyvinyl chloride, polyvinylidene chloride, polyvinyl acetate, polyvinyl alcohol, copolymers of the basic monomers of polyvinyl chloride, polyvinylidene chloride, polyvinyl acetate and polyvinyl alcohol, ethylene-vinyl-(alcohol) acetate copolymers and graft polymers produced with vinyl chloride containing as a lubricant the reaction product of an organosiloxane compound containing at least one reactive hydrogen as determined by the Zerewitinoff method and a member selected from the group consisting of an organic monoisocyanate, polyisocyanate and organic polyisothiocyanate, said reaction product having a molecular weight of at least about 3,000.

2. The composition of claim 1 in which the organosiloxane compound is

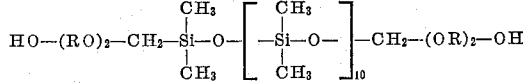

wherein R is a member selected from the group consisting of

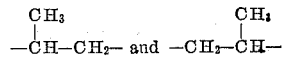

3. The composition of claim 1 in which the organosiloxane compound is

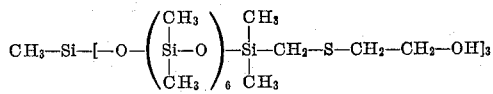

4. The composition of claim 1 in which the organosiloxane compound is

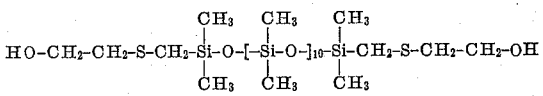

5. The synthetic resin composition of claim 1 in which the reaction product contained in the composition as a lubricant is the reaction product of (1) the organosiloxane compound, (2) the member selected from the group consisting of an organic monoisocyanate, polyisocyanate and organic polyisothiocyanate and (3) a member selected from the group consisting of monohydric alcohols, polyhydric alcohols, amines, amino alcohols, polyesters, polyethers, polythioethers, polyesteramides, polyacetals and water.

6. The composition of claim 1 in which the group member is the polyisocyanate tolylene diisocyanate.

7. The composition of claim 1 in which the group member is the polyisocyanate hexamethylene diisocyanate.

References Cited

UNITED STATES PATENTS

| 2,792,309 | 5/1957 | Teichmann | 260—827 |
| 2,888,419 | 5/1959 | Safford. | |
| 3,178,391 | 4/1965 | Holtschmidt et al. | |
| 3,179,622 | 4/1965 | Haluska. | |
| 3,243,475 | 3/1966 | Reischl et al. | |

FOREIGN PATENTS 1,066,686  10/1959  Germany.

MORRIS LIEBMAN, *Primary Examiner.*

L. T. JACOBS, *Assistant Examiner.*